United States Patent
Pandurangan et al.

(10) Patent No.: US 11,194,710 B2
(45) Date of Patent: *Dec. 7, 2021

(54) GARBAGE COLLECTION—AUTOMATIC DATA PLACEMENT

(71) Applicant: Samsung Electronics Co., Ltd., Suwon-si (KR)

(72) Inventors: Rajinikanth Pandurangan, Fremont, CA (US); Changho Choi, San Jose, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 16/892,276

(22) Filed: Jun. 3, 2020

(65) Prior Publication Data

US 2020/0293443 A1    Sep. 17, 2020

Related U.S. Application Data

(63) Continuation of application No. 15/620,814, filed on Jun. 12, 2017, now Pat. No. 10,698,808.

(Continued)

(51) Int. Cl.
*G06F 12/02* (2006.01)
*G06F 3/06* (2006.01)

(52) U.S. Cl.
CPC ........ *G06F 12/0246* (2013.01); *G06F 3/0608* (2013.01); *G06F 3/0652* (2013.01);
(Continued)

(58) Field of Classification Search
CPC ......... G06F 2212/7201; G06F 12/0246; G06F 3/0608; G06F 2212/7205; G06F 3/0652;
(Continued)

(56) References Cited

U.S. PATENT DOCUMENTS 8,429,658 B2    4/2013    Auerbach et al.
8,688,894 B2    4/2014    Kuehne
(Continued)

FOREIGN PATENT DOCUMENTS

JP    2006235960 A    9/2006
JP    5723812 B2    5/2015
(Continued)

OTHER PUBLICATIONS

Advisory Action for U.S. Appl. No. 15/620,814, dated May 13, 2019.
(Continued)

*Primary Examiner* — Daniel D Tsui
*Assistant Examiner* — Zubair Ahmed
(74) *Attorney, Agent, or Firm* — Renaissance IP Law Group LLP

(57) ABSTRACT

A Solid State Drive (SSD) is disclosed. The SSD may include flash memory to store data. An SSD controller may manage reading and writing data to the flash memory. The SSD may include an automatic stream detection logic to select a stream identifier responsive to attributes of data. A garbage collection logic may select an erase block and program valid data in the erase block into a second block responsive to a stream ID determined the automatic stream detection logic. The stream ID may be determined after the garbage collection logic has selected the erase block for garbage collection.

20 Claims, 9 Drawing Sheets

Related U.S. Application Data

(60) Provisional application No. 62/490,027, filed on Apr. 25, 2017.

(52) U.S. Cl.
CPC .... *G06F 3/0679* (2013.01); *G06F 2212/1044* (2013.01); *G06F 2212/2022* (2013.01); *G06F 2212/7201* (2013.01); *G06F 2212/7205* (2013.01)

(58) Field of Classification Search
CPC .......... G06F 3/0679; G06F 2212/2022; G06F 2212/1044
USPC ....................................................... 711/103
See application file for complete search history.

(56) References Cited

U.S. PATENT DOCUMENTS

| | | |
|---|---|---|
| 8,874,835 B1 | 10/2014 | Davis et al. |
| 8,886,880 B2 | 11/2014 | Barrell et al. |
| 9,158,687 B2 | 10/2015 | Barrell et al. |
| 9,459,810 B2 | 10/2016 | Benisty et al. |
| 9,594,513 B1 | 3/2017 | Delgado et al. |
| 9,854,270 B2 | 12/2017 | Ramasubramonian et al. |
| 10,095,613 B2 | 10/2018 | Jo et al. |
| 2009/0119352 A1 | 5/2009 | Branda et al. |
| 2012/0072798 A1 | 3/2012 | Unesaki et al. |
| 2012/0110239 A1 | 5/2012 | Goss et al. |
| 2012/0191900 A1 | 7/2012 | Kunimatsu et al. |
| 2013/0159626 A1 | 6/2013 | Katz et al. |
| 2014/0189270 A1 | 7/2014 | Iwanicki et al. |
| 2015/0169449 A1 | 6/2015 | Barrell et al. |
| 2015/0370630 A1 | 12/2015 | Yang |
| 2016/0162203 A1 | 6/2016 | Grimsrud |
| 2016/0179386 A1 | 6/2016 | Zhang |
| 2016/0253257 A1 | 9/2016 | Kim et al. |
| 2016/0266792 A1 | 9/2016 | Amaki et al. |
| 2016/0283116 A1 | 9/2016 | Ramalingam |
| 2016/0283124 A1* | 9/2016 | Hashimoto ........... G06F 16/164 |
| 2016/0283125 A1 | 9/2016 | Hashimoto et al. |
| 2016/0291872 A1 | 10/2016 | Hashimoto et al. |
| 2016/0299715 A1 | 10/2016 | Hashimoto et al. |
| 2016/0306552 A1 | 10/2016 | Liu et al. |
| 2016/0313943 A1 | 10/2016 | Hashimoto et al. |
| 2017/0031631 A1 | 2/2017 | Lee et al. |
| 2017/0075614 A1* | 3/2017 | Kanno .................. G06F 3/0605 |
| 2017/0153848 A1 | 6/2017 | Martineau et al. |
| 2017/0329668 A1 | 11/2017 | Yang |
| 2018/0039448 A1 | 2/2018 | Harasawa et al. |
| 2018/0276118 A1* | 9/2018 | Yanagida .............. G06F 3/0688 |

FOREIGN PATENT DOCUMENTS

| | | |
|---|---|---|
| JP | 2016095828 A | 5/2016 |
| JP | 2016170583 A | 9/2016 |
| KR | 20150028610 A | 3/2015 |
| KR | 101544309 B1 | 8/2015 |
| TW | 201510722 A | 3/2015 |
| TW | 201536038 A | 9/2015 |
| TW | 201601062 A | 1/2016 |
| WO | 2012020544 A1 | 2/2012 |
| WO | 2015005634 A1 | 1/2015 |

OTHER PUBLICATIONS

Final Office Action for U.S. Appl. No. 15/458,968, dated Jul. 27, 2018.
Final Office Action for U.S. Appl. No. 15/620,814, dated Feb. 21, 2019.
Final Office Action for U.S. Appl. No. 15/620,814, dated Sep. 18, 2019.
Final Office Action for U.S. Appl. No. 15/821,708, dated Jun. 20, 2019.
Final Office Action for U.S. Appl. No. 15/821,708, dated May 20, 2020.
Notice of Allowance for U.S. Appl. No. 15/458,968, dated Oct. 12, 2018.
Notice of Allowance for U.S. Appl. No. 15/620,814, dated Feb. 26, 2020.
Notice of Allowance for U.S. Appl. No. 16/219,936, dated Apr. 2, 2020.
Office Action for U.S. Appl. No. 15/458,968, dated Apr. 10, 2018.
Office Action for U.S. Appl. No. 15/620,814, dated Jul. 17, 2019.
Office Action for U.S. Appl. No. 15/620,814, dated Jun. 19, 2018.
Office Action for U.S. Appl. No. 15/620,814, dated Oct. 18, 2018.
Office Action for U.S. Appl. No. 15/821,708, dated Jan. 22, 2020.
Office Action for U.S. Appl. No. 15/821,708, dated Jan. 24, 2019.
Office Action for U.S. Appl. No. 16/219,936, dated Oct. 4, 2019.
Office Action for U.S. Appl. No. 16/866,545, dated Sep. 23, 2020.
Notice of Allowance for U.S. Appl. No. 16/866,545, dated Feb. 19, 2021.
Kang, Jeong-Uk, et al., "The Multi-streamed Solid-State Drive," HotStorage 14, 6th USENIX Workshop on Hot Topics in Storage and File Systems, Jun. 2014.
Notice of Allowance for U.S. Appl. No. 15/821,708, dated Jul. 29, 2020.

\* cited by examiner

GARBAGE COLLECTION—AUTOMATIC DATA PLACEMENT

RELATED APPLICATION DATA

This application is a continuation of U.S. patent application Ser. No. 15/620,814, filed Jun. 12, 2017, now allowed, which claims the benefit of U.S. Provisional Patent Application Ser. No. 62/490,027, filed Apr. 25, 2017, both of which are incorporated by reference herein for all purposes.

This application is related to U.S. patent application Ser. No. 15/499,877, filed Apr. 27, 2017, which: claims the benefit of U.S. Provisional Patent Application Ser. No. 62/458,566, filed Feb. 13, 2017, and U.S. Provisional Patent Application Ser. No. 62/471,350, filed Mar. 14, 2017; which is a continuation-in-part of U.S. patent application Ser. No. 15/344,422, filed Nov. 4, 2016, which claims the benefit of U.S. Provisional Patent Application Ser. No. 62/383,302 and which is a continuation-in-part of U.S. patent application Ser. No. 15/144,588, filed May 2, 2016, which claims the benefit of U.S. Provisional Patent Application Ser. No. 62/245,100, filed Oct. 22, 2015 and U.S. Provisional Patent Application Ser. No. 62/192,045, filed Jul. 13, 2015; and which is a continuation-in-part of U.S. patent application Ser. No. 15/090,799, filed Apr. 5, 2016, which claims the benefit of U.S. Provisional Patent Application Ser. No. 62/245,100, filed Oct. 22, 2015 and U.S. Provisional Patent Application Ser. No. 62/192,045, filed Jul. 13, 2015, all of which are incorporated by reference herein for all purposes.

This application is related to U.S. patent application Ser. No. 15/458,968, filed Apr. 6, 2017, which claims the benefit of U.S. Provisional Patent Application Ser. No. 62/448,958, filed Jan. 20, 2017, and U.S. Provisional Patent Application Ser. No. 62/413,177, filed Oct. 26, 2016, all of which are incorporated by reference herein for all purposes.

This application is related to U.S. patent application Ser. No. 15/167,974, filed May 27, 2016, which claims the benefit of U.S. Provisional Patent Application Ser. No. 62/309,446, filed Mar. 16, 2016, both of which are incorporated by reference herein for all purposes.

This application is related to U.S. patent application Ser. No. 15/146,708, filed May 4, 2016, which claims the benefit of U.S. Provisional Patent Application Ser. No. 62/302,162, filed Mar. 1, 2016, and is a continuation-in-part of Ser. No. 15/046,439, filed Feb. 17, 2016, which claims the benefit of U.S. Provisional Patent Application Ser. No. 62/261,303, filed Nov. 30, 2015, all of which are incorporated by reference herein for all purposes.

FIELD

The inventive concepts relate generally to Solid State Drives (SSDs), and more particularly to improving garbage collection within SSDs.

BACKGROUND

Multi-streaming is a scheme is developed to provide better endurance and performance for Solid State Drives (SSDs). Data with the same stream ID may be assigned to a stream, and ultimately stored together in the same erase block(s). Data with the same stream ID may be expected to be invalidated together, meaning that the data has the same lifetime. When garbage collection occurs, overhead is reduced if all of the pages of the erase block are invalid, as there is no valid data remaining in the erase block that would need to be programmed to another block.

SSDs or Flash Translation Layers (FTLs) may include automatic stream detection algorithms, which may generate stream IDs based on attributes of the data operations (such as, frequency, recency, sequentiality, etc.) and place the data in stream-appropriate erase blocks. But when garbage collection occurs, valid data associated with different streams may be mixed, undermining the utility of multi-streaming.

A need remains for a way to manage the selection of blocks into which valid data may be programmed during garbage collection, to maintain the benefit of multi-streaming.

DETAILED DESCRIPTION

Figure 1:
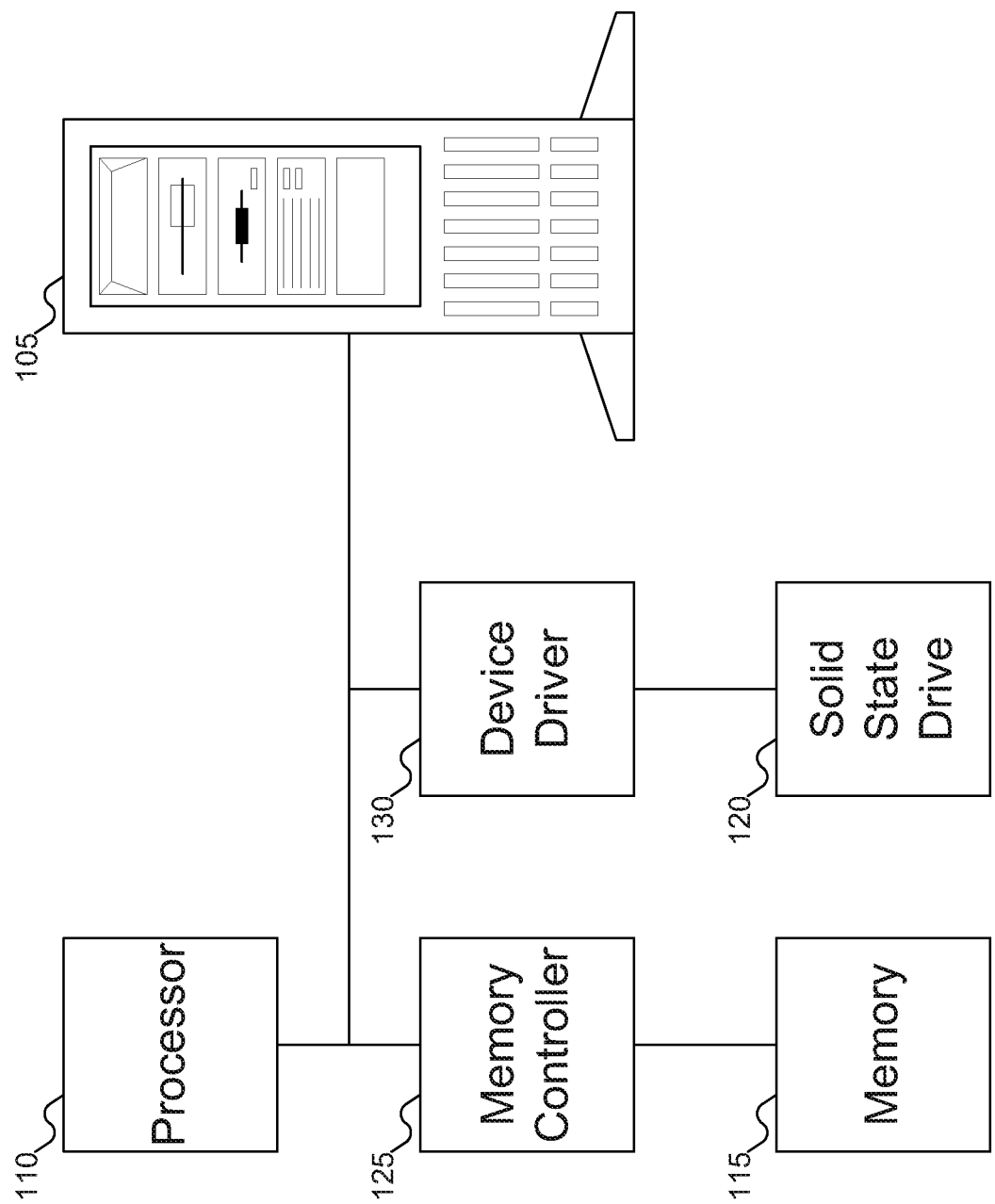
FIG. 1 shows a machine with a Solid State Drive (SSD), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

In the case of stream-based garbage collection, there is a chance that different lifetime data could still be mixed even though the data was originally placed in blocks based on the stream ID. This result may occur because the lifetime of data in a single stream may evolve over time. For example, there might be periods where hot data might be assigned a stream identifier (ID) of 8. But as the workload changes on the host, the data temperature changes, so older data blocks assigned to a given stream ID might not have the same life expectancy as newer blocks with the same stream ID.

But even garbage collection may make use of streaming. Valid data being programmed as part of garbage collection may use an automatic stream detection algorithm by passing a logical block address (LBA)—or any other attribute—for valid data in an erase block, and writing the valid data into a correspondingly detected current stream ID for those valid LBAs. This approach would help to place the valid data with other data the similar characteristics. In addition, as the stream ID is re-determined at the time the data is programmed, there is no need to store the stream ID with the data.

There are two approaches that may be used to program valid data using stream IDs. One way is to treat the program operation as a new write. More specifically, the valid data may be submitted to the SSD in a write request that may look like an original write request from an application. This approach has two advantages: first, the garbage collection does not have to specifically write the valid data, but may leave that process to already-existing logic within the SSD; second, the erase block may be erased before the valid data is actually written to the new block. But this approach does have the concern that if a power failure (or some similar unfortunate event) were to occur after the block had been erased and before the scheduled write of the valid data had completed, the data could be lost. Another way is to have the garbage collection logic request a stream ID from the automatic stream detection algorithm, and use that stream ID to determine where to write the valid data.

FIG. 1 shows a machine with a Solid State Drive (SSD), according to an embodiment of the inventive concept. In FIG. 1, machine 105 is shown. Machine 105 may be any desired machine, including without limitation a desktop or laptop computer, a server (either a standalone server or a rack server), or any other device that may benefit from embodiments of the inventive concept. Machine 105 may also include specialized portable computing devices, tablet computers, smartphones, and other computing devices. Machine 105 may run any desired applications: database applications are a good example, but embodiments of the inventive concept may extend to any desired application.

Machine 105, regardless of its specific form, may include processor 110, memory 115, and Solid State Drive (SSD) 120. Processor 110 may be any variety of processor: for example, an Intel Xeon, Celeron, Itanium, or Atom processor, an AMD Opteron processor, an ARM processor, etc. While FIG. 1 shows a single processor, machine 105 may include any number of processors. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc., but is typically DRAM. Memory 115 may also be any desired combination of different memory types. Memory 115 may be controlled by memory controller 125, also part of machine 105.

SSD 120 may be any variety of SSD, and may even be extended to include other types of storage that perform garbage collection (even when not using flash memory). SSD 120 may be controlled by device driver 130, which may reside within memory 115.

Figure 2:
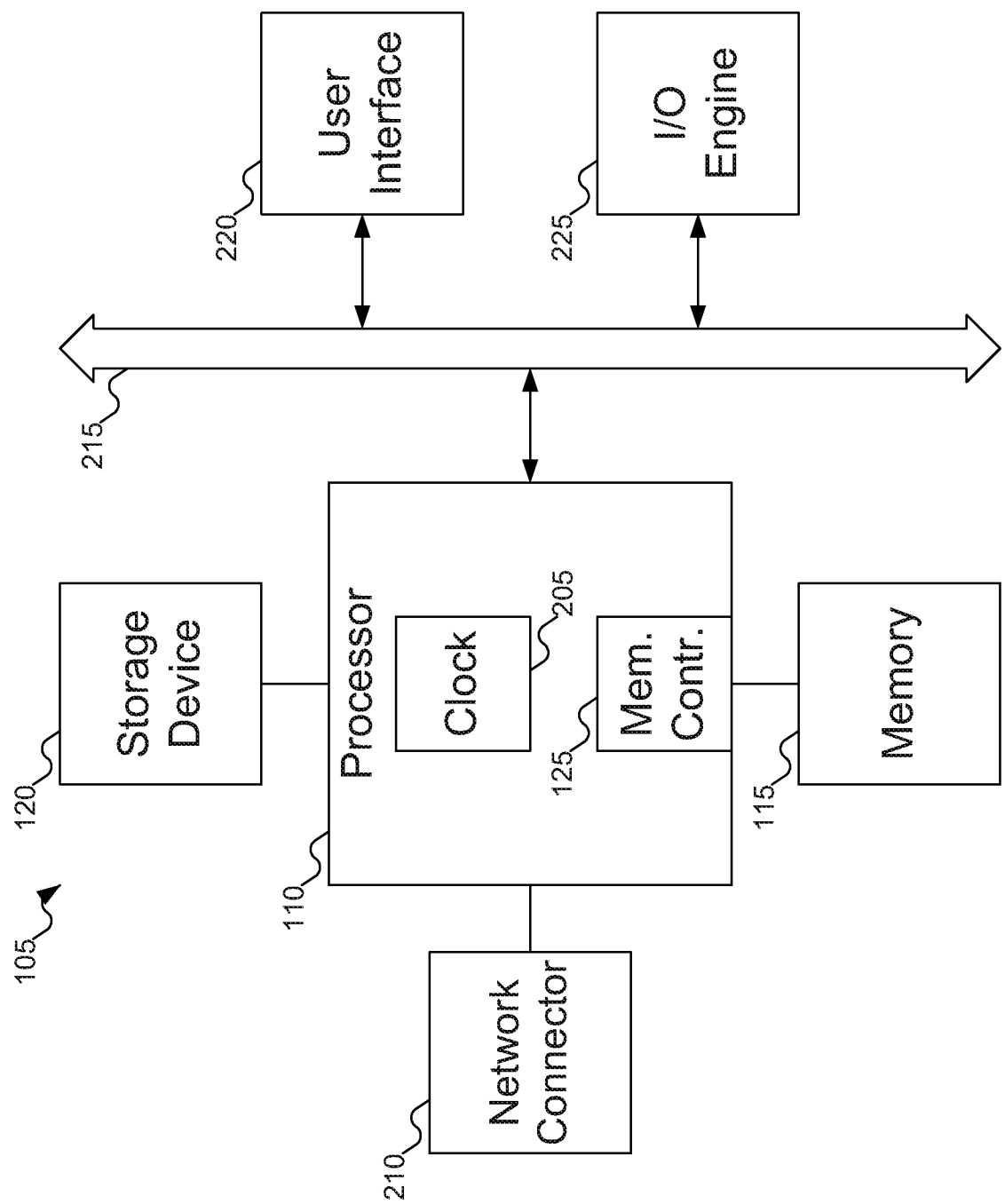
FIG. 2 shows additional details of the machine of FIG. 1.
Figure 3:
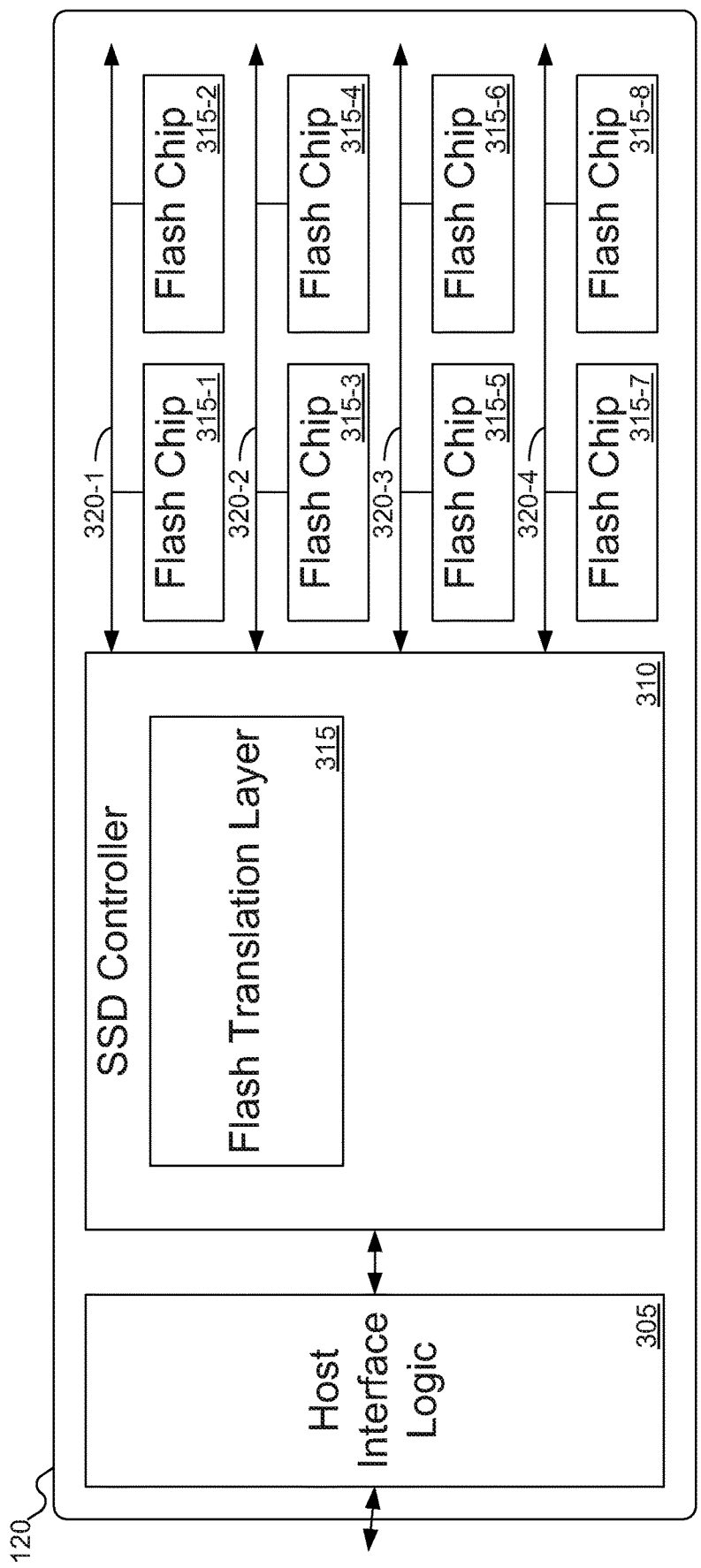
FIG. 3 shows details of the SSD of FIG. 1.

FIG. 2 shows additional details of machine 105 of FIG. 1. Referring to FIG. 2, typically, machine 105 includes one or more processors 110, which may include memory controller 125 and clock 205, which may be used to coordinate the operations of the components of machine 105. Processors 110 may also be coupled to memory 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to a bus 215, to which may be attached user interface 220 and Input/Output interface ports that may be managed using Input/Output engine 225, among other components. FIG. 3 shows details of SSD 120 of FIG. 1. In FIG. 3, SSD 120 may include host interface logic 305, SSD controller 310, and various flash memory chips 315-1 through 315-8, which may be organized into various channels 320-1 through 320-4. Host interface logic 305 may manage communications between SSD 120 and machine 105 of FIG. 1. SSD controller 310 may manage the read and write operations, along with garbage collection operations, on flash memory chips 315-1 through 315-8. SSD controller 310 may include flash translation layer 325 to perform some of this management. While FIG. 3 shows SSD 120 as including eight flash memory chips 315-1 through 315-8 organized into four channels 320-1 through 320-4, embodiments of the inventive concept may support any number of flash memory chips organized into any number of channels.

Figure 4:
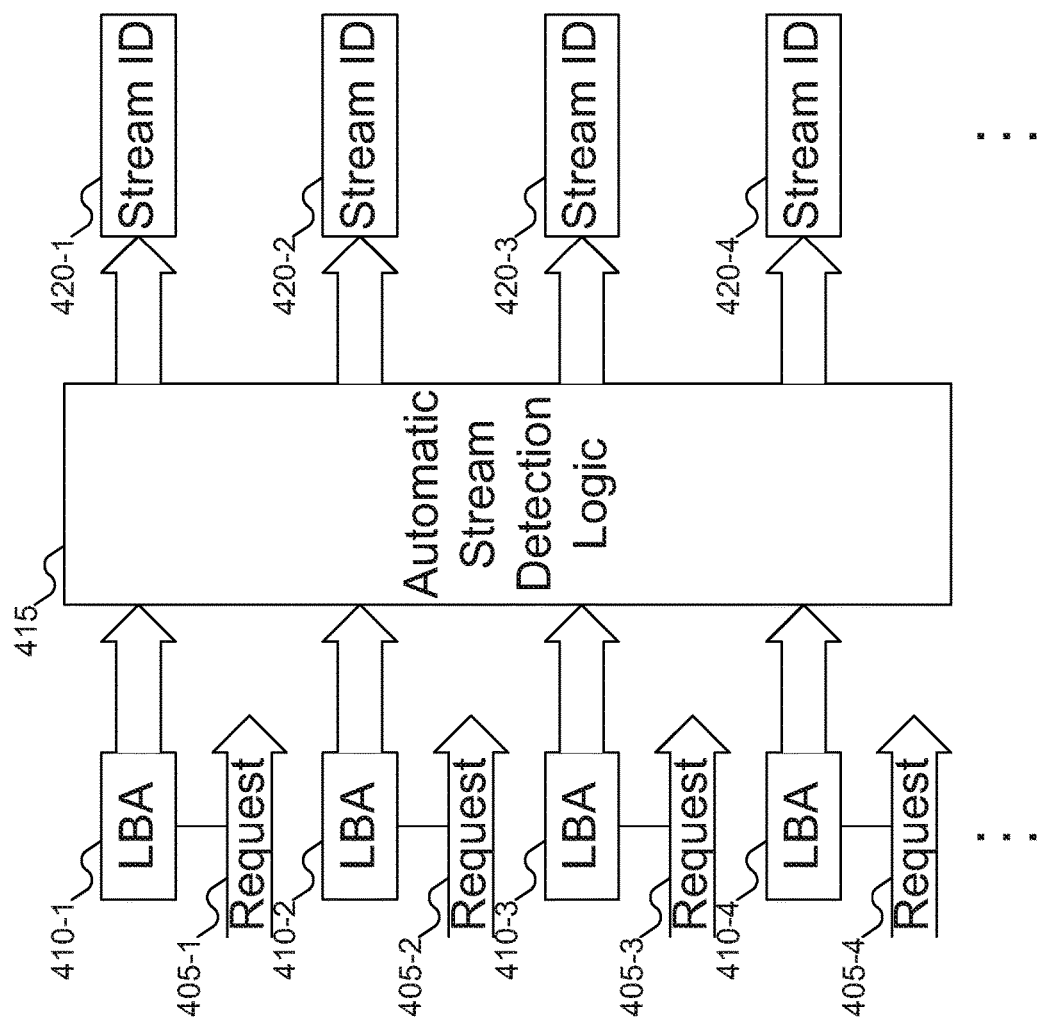
FIG. 4 shows an automatic stream detection logic determining stream IDs for write requests.

FIG. 4 shows an automatic stream detection logic determining stream IDs for write requests. In FIG. 4, various write requests 405-1 through 405-4 are shown. Each write request 405-1 through 405-4 may include Logical Block Addresses (LBAs) 410-1 through 410-4, respectively. LBAs 410-1 through 410-4 may be used by automatic stream detection logic 415 to determine stream identifiers (IDs) 420-1 through 420-4 to which write requests 405-1 through 405-4 are assigned. For example, automatic stream detection logic 415 may operate as described in U.S. patent application Ser. No. 15/499,877, filed Apr. 27, 2017, incorporated by reference herein for all purposes, to assign stream IDs 420-1 through 420-4 based on LBAs 410-1 through 410-4. But while FIG. 4 shows automatic stream detection logic 415 using LBAs 410-1 through 410-4 to determine stream IDs 420-1 through 420-4, embodiments of the inventive concept may use any desired attributes of write requests 405-1 through 405-4 in determining stream IDs 420-1 through 420-4.

In SSDs that use flash memory (and also other devices that perform garbage collection), the flash memory is usually organized into erase blocks containing multiple pages. Each page may be in one of three states: free (currently not storing any data), valid (currently storing data), and invalid (previously storing valid data, but no longer storing valid data and not yet free).

When new data is written to the flash memory, a free page is located and the data written to that free page. The page is then marked as storing valid data. Pages are typically written in order within an erase block. But an individual page of flash memory usually may be written to once; it may not be overwritten. Therefore when data stored in flash memory is to be changed by an application, the entire page containing the data is written to a new page in flash memory. The original page is then marked as invalid. Garbage collection is the process by which the SSD reclaims invalid pages at an erase block granularity. This process includes resetting all the pages in an erase block and marking the pages as free once again.

The reason pages may have three possible states rather than just two is due to how garbage collection is performed. If garbage collection were performed on individual pages, there would be no need for the invalid state: garbage collection could occur as soon as the data was invalidated and the page immediately freed. But garbage collection typically operates on chunks larger than an individual page. These chunks are termed erase blocks or superblocks and may include any number of pages. When a block is subject to garbage collection, every page in the block is put in the free state. Therefore, any currently valid data in the block must be written to another free page in the flash memory in some other block (this process is termed programming) before the pages in the current block may be erased. If garbage collection were initiated as soon as any data in the block were invalidated, the SSD would spend a significant amount of time moving data from valid pages in the block to other blocks. Aside from the fact that programming valid data from an erase block may add significant overhead by itself, flash memory typically may be accessed only a finite number of times before the memory becomes unreliable (or worse, unusable). Therefore, it is desirable to minimize the amount of time spent programming valid data from an erase block. But at the same time, garbage collection may not be deferred until every page in an erase block is marked invalid: the flash memory might end up with every block containing only pages marked valid or invalid (that is, no free pages), which would mean no further data could be written to the flash memory.

Figure 5:
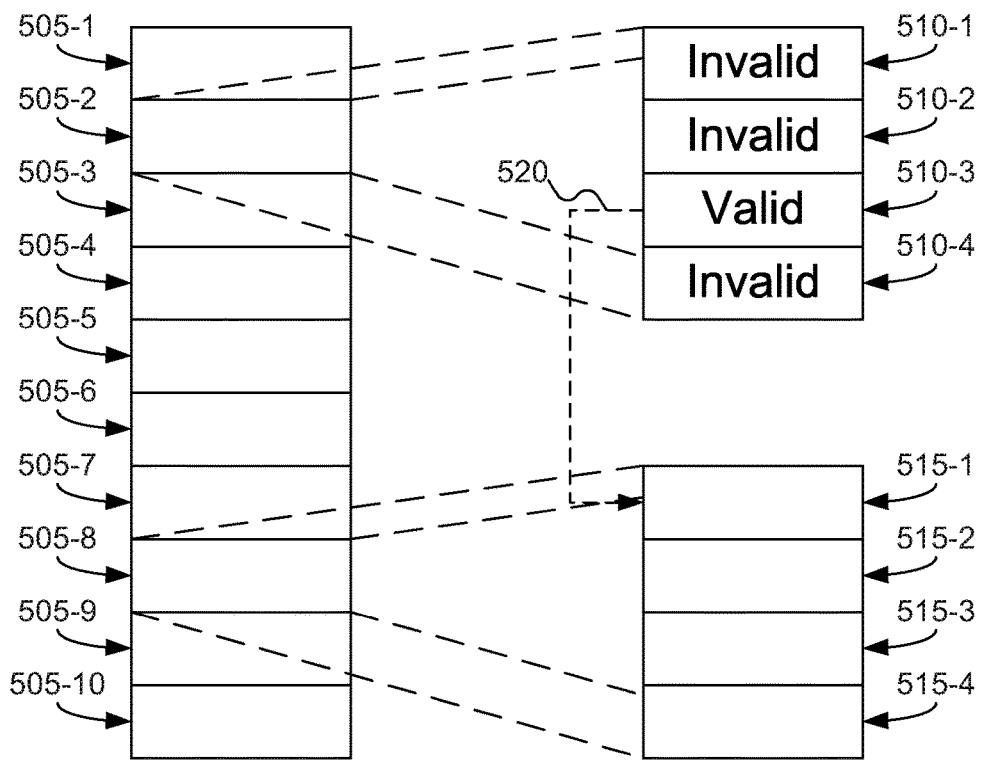
FIG. 5 shows garbage collection in the SSD of FIG. 1 moving valid data from an erase block to another block.

FIG. 5 shows garbage collection in SSD 120 of FIG. 1 programming valid data from an erase block to another block. In FIG. 5, blocks 505-1 through 505-10 are shown, with block 505-2 shown with greater detail. Block 505-2 is shown as including four pages 510-1 through 510-4. Pages 510-1, 510-2, and 510-4 currently are marked as invalid, but page 510-3 is marked as valid, meaning that it currently stored valid data. Thus, when block 505-2 is targeted for garbage collection, the valid data in page 510-3 must be programmed to another block, such as block 505-8, shown as including pages 515-1 through 515-4. The valid data in page 510-3 may be programmed into page 515-1, as shown by dashed arrow 520. After the valid data in page 510-3 is programmed into page 515-1, all the pages in block 505-2 are marked invalid, and the entire erase block may be subject to garbage collection.

While FIG. 5 shows ten blocks 505-1 through 505-10 and each block including four pages, embodiments of the inventive concept may support SSD 120 of FIG. 1 including any number of blocks, with each block having any number of pages. Embodiments of the inventive concept are not limited to a particular number of blocks or pages per block.

Figure 6:
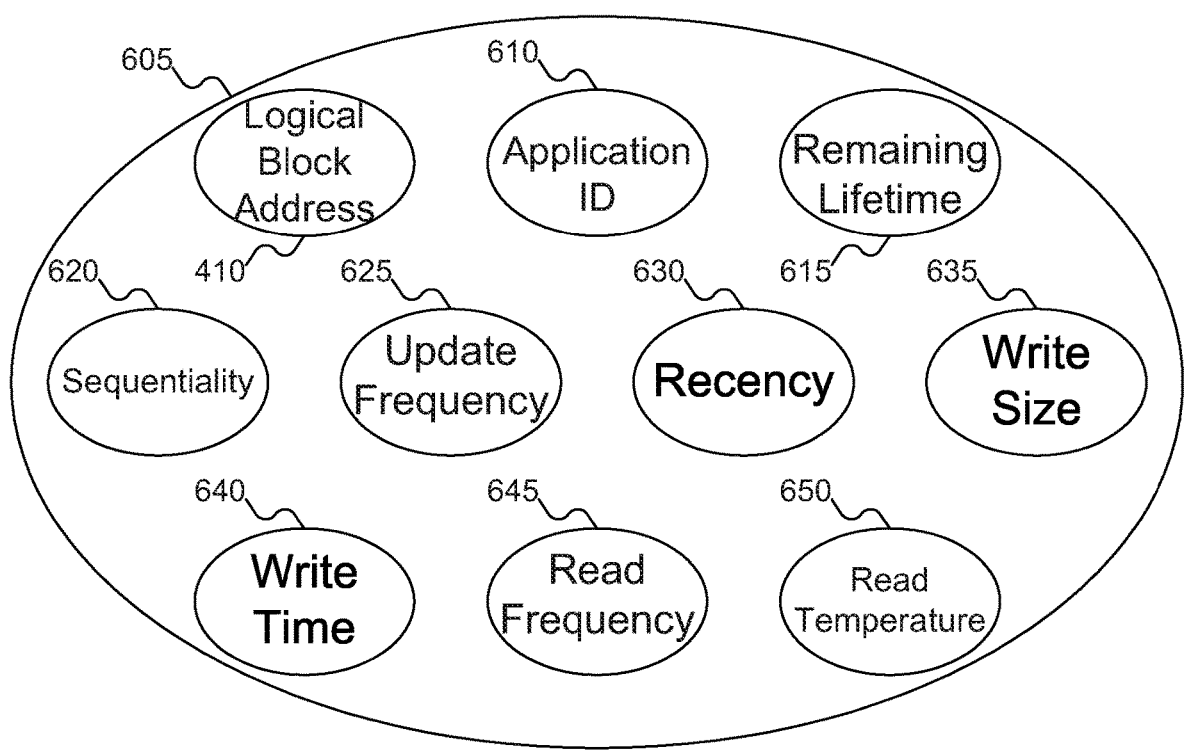
FIG. 6 shows various attributes of data that may be used in determining a stream ID.

FIG. 6 shows various attributes of data that may be used in determining stream IDs 420-1 through 420-4 of FIG. 4. In FIG. 6, attributes 605 are shown. Attributes 605 may include LBA 410, application ID 610, and remaining lifetime 615. Thus, for example, LBA 410 may be the LBA of data being written to SSD 120 of FIG. 1, application ID 610 may be the application requesting that the data be written to SSD 120 of FIG. 1, and remaining lifetime 615 may be how long the data is expected to remain on SSD 120 of FIG. 1 before the data is invalidated (either by being replaced with newer data or simply deleted outright). Other possible attributes used in determining stream IDs may include:

Sequentiality 620: whether the LBA of the data being written is in a page that is sequential to an earlier LBA (either the immediately preceding write request or some earlier write request within a window).

Update frequency 625: how frequently the data being written is expected to be updated (which would invalidate the page where the current data is to be written).

Recency 630: how recently the LBA of the data being written was previously written.

Write size 635: the size of the data being written (relative to the size of other writes around the same time).

Write time 640: the time at which the data is being written (relative to other writes around the same time).

Read frequency 645: how frequently the data being read is read (relative to other data).

Read temperature 650: the "temperature" of the data being read: that is, whether the data being read is considered "hot" or "cool".

Embodiments of the inventive concept may support other attributes beyond those shown in FIG. 6: for example, a Quality of Service (QoS) desired by the application writing the data: any other attribute may also be used, as desired.

In the prior art, stream IDs 420-1 through 420-4 of FIG. 4 are determined only when write requests 405-1 through 405-4 are received. While stream IDs 420-1 through 420-4 of FIG. 4 may be stored as metadata for the data written by write requests 405-1 through 405-4 of FIG. 4, stream IDs 420-1 through 420-4 of FIG. 4 are not updated. But when valid data in an erase block, such as valid data 510-3 of FIG. 5, is to be written to a new block as part of garbage collection, the stream ID determined at the time valid data 510-3 of FIG. 5 was originally written may not properly represent the stream currently matching valid data 510-3 of FIG. 5. Put another way, if valid data 510-3 of FIG. 5 were received as a new write request at this time, valid data 510-3 of FIG. 5 might be assigned to a different stream than it was assigned when originally written. The advantage of updating the stream ID when programming valid data 510-3 of FIG. 5 is that valid data 510-3 of FIG. 5 may be programmed into a block storing data with more similar attributes than might occur if the original stream ID were used to select a block into which to write valid data 510-3 of FIG. 5.

Figure 7:
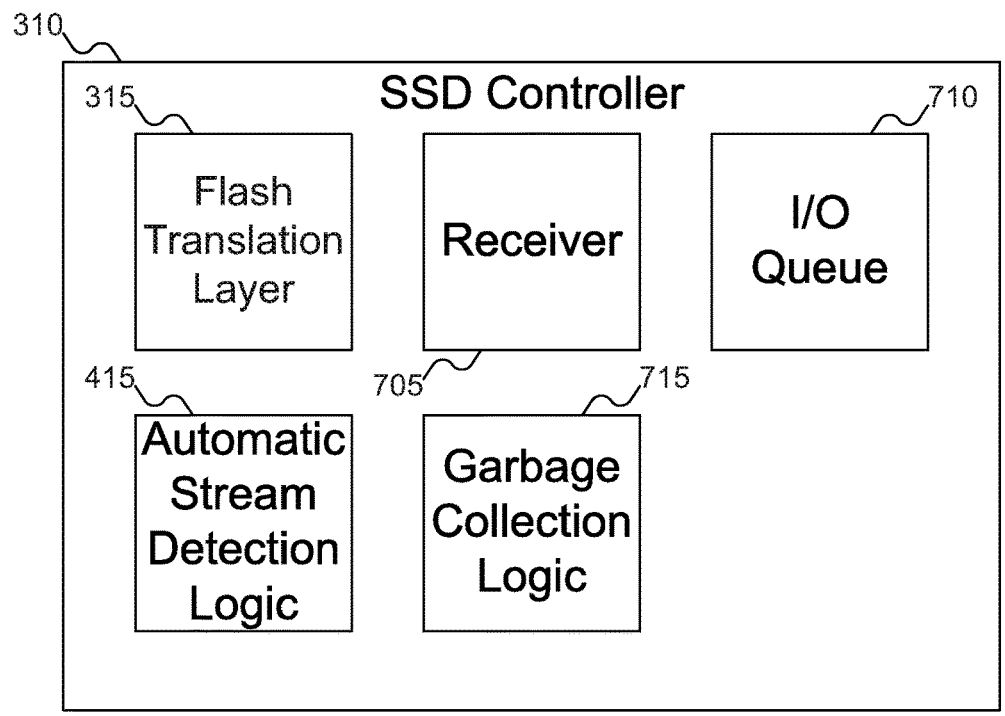
FIG. 7 shows details of the SSD controller of FIG. 3.

Now that the process of garbage collection and the benefits of applying stream IDs 420-1 through 420-4 of FIG. 4 to the garbage collection process have been explained, embodiments of the inventive concept may be discussed further. FIG. 7 shows details of SSD controller 310 of FIG. 3. In FIG. 7, aside from flash translation layer 315, SSD controller 310 may include receiver 705, Input/Output (I/O) queue 710, automatic stream detection logic 415, and garbage collection logic 715. Receiver 705 may receive write requests 405-1 through 405-4 of FIG. 4 from any source, such as an application running on machine 105 of FIG. 1. Once received, write requests 405-1 through 405-4 of FIG. 4 may be placed in I/O queue 710 for processing. When a particular write request is removed from I/O queue 710, automatic stream detection logic 415 may be used to determine an appropriate stream ID for the write request, after which the data may be written to an appropriate flash memory 315-1 through 315-8 of FIG. 3.

Garbage collection logic 715 may recover erase blocks from flash memory 315-1 through 315-8 of FIG. 3 as appropriate. Erase blocks may be selected using any desired algorithm. But rather than programming valid data 510-3 of FIG. 5 into any random available page, garbage collection logic 715 may benefit from the use of automatic stream detection logic 415 in selecting an appropriate block to program valid data 510-3 of FIG. 5. Garbage collection logic is discussed further with reference to FIG. 8 below.

Figure 8:
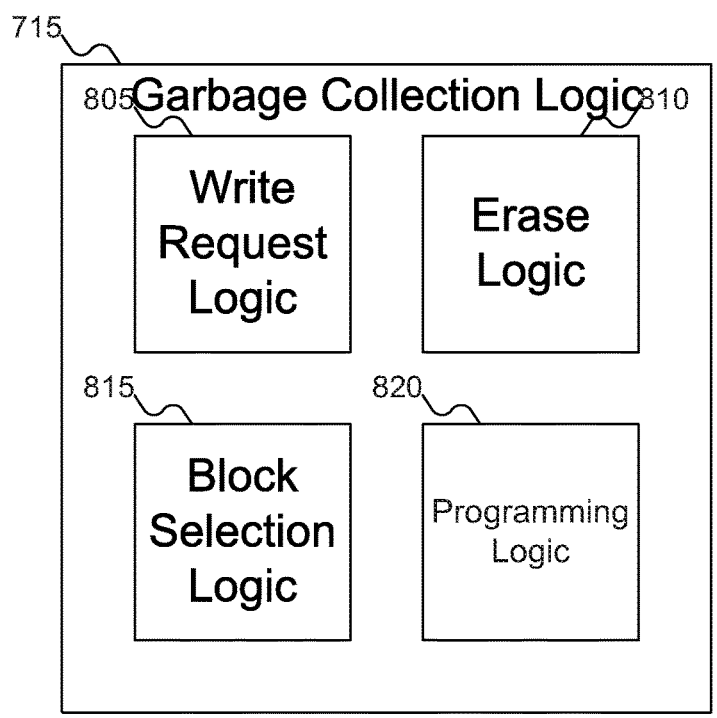
FIG. 8 shows details of the garbage collection logic of FIG. 7.

FIG. 8 shows details of garbage collection logic 715 of FIG. 7. In one embodiment of the inventive concept, garbage collection logic 715 may include write request logic 805 and erase logic 810. When garbage collection logic 715 is invoked to erase an erase block, such as erase block 505-2 of FIG. 5, assuming there is valid data 510-3 of FIG. 5 in the erase block, then write request logic 805 may submit a write request to receiver 705 and I/O queue 710 of FIG. 7, just as though the write request were submitted by an application running on machine 105 of FIG. 1. (If the erase block contains no pages with valid data, then obviously there is no valid data that needs to be programmed: every page in the erase block contains invalid data and the erase block may be erased directly.) In this manner, when the write request is processed, valid data 510-3 is written to a new page in SSD 120 of FIG. 1. From the perspective of SSD 120 of FIG. 1, this write request is no different than a write request submitted by an application running on machine 105 of FIG. 1, and is processed accordingly. And once the write request has been submitted to I/O queue 710 of FIG. 7, erase logic 810 may erase block 505-2 of FIG. 5. Note that garbage collection logic 715 does not need to wait for valid data to be written to a new page before erase logic 810 may begin: the valid data in entirely within I/O queue 710 of FIG. 7, and will be written in turn. Of course, if guaranteeing that no data is lost due to unforeseen circumstances, such as a power failure, then erase logic 810 may wait until the data has been successfully written before proceeding to erase erase block 505-2 of FIG. 5. But if SSD 120 of FIG. 1 provides such a guarantee, then it is likely that there are already other mechanisms within SSD 120 of FIG. 1 to ensure data in I/O queue 710 of FIG. 7 is not lost due to unforeseen circumstances.

Figure 9:
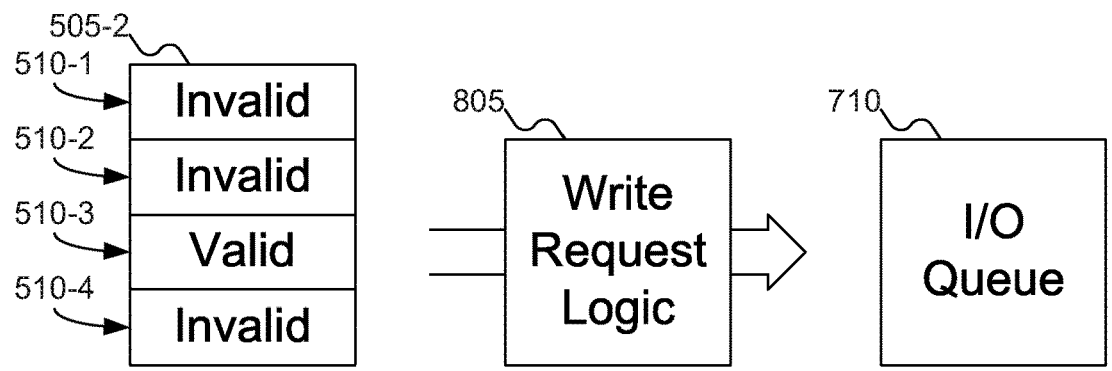
FIG. 9 shows the write request logic of FIG. 8 submitting valid data to the Input/Output (I/O) queue of FIG. 7 to program valid data, according to an embodiment of the inventive concept.

FIG. 9 shows write request logic 805 of FIG. 8 submitting valid data to I/O queue 710 of FIG. 7 to program valid data, according to an embodiment of the inventive concept. In FIG. 9, once block 505-2 has been selected as an erase block and valid data 510-3 has been identified, write request logic 805 may create a write request to re-write valid data 510-3 back to a new page on SSD 120 of FIG. 1. This write request may be submitted to I/O queue 710 and processed identically to an original write request coming from an application running on machine 105 of FIG. 1.

While one might think that placing valid data 510-3 in I/O queue 710 to avoid programming valid data 510-3 directly by garbage collection logic 715 of FIG. 7 may increase the write latency of original write requests, the actual impact on write latency might be minimal. Ideally, garbage collection logic 715 of FIG. 7 operates when other demands on SSD 120 of FIG. 1 are low. If SSD 120 of FIG. 1 is receiving many original write requests from applications running on machine 105 of FIG. 1, then garbage collection logic 715 of FIG. 7 would hopefully not start recovering erase blocks. Garbage collection logic 715 of FIG. 7 might begin if SSD 120 of FIG. 1 has an unusually low free page count. But if that situation were to arise, the programming of valid data would likely occur anyway, with a similar expected impact on the write latency of original write requests. Thus, using I/O queue 710 to program valid data 510-3 as though it were an original write request is not likely to have a greater impact than traditional garbage collection would. And because valid data 510-3 is likely to be placed with other data with similar attributes (such as remaining lifetime), garbage collection performance is enhanced by reducing future programming of valid data.

Returning to FIG. 8, another embodiment of the inventive concept, garbage collection logic 715 may include erase logic 810, block selection logic 815, and programming logic 820. Block selection logic 815 may access automatic stream detection logic 415 of FIG. 7 to determine a new stream ID for valid data 510-3 of FIG. 5. That is, block selection logic 815 may pass one or more attributes 605 of FIG. 6 for valid data 510-3 of FIG. 5 to automatic stream detection logic 415 of FIG. 7, and receive a stream ID in return. Block selection logic 815 may then use this stream ID to select an appropriate block in which to program valid data 510-3, which may be performed by programming logic 820 using conventional techniques. Note that block selection logic 815 may select any appropriate block based on the stream ID received from automatic stream detection logic 415 of FIG. 7. For example, the selected block might be a block holding data written in respond to original write requests received from an application running on machine 105 of FIG. 1 having the selected stream ID. Or, the selected block might be a special block, storing only data programmed as a result of garbage collection and assigned that stream ID. Embodiments of the inventive concept may also implement block selection logic 815 to select a block responsive to the received stream ID in other ways.

Figure 10:
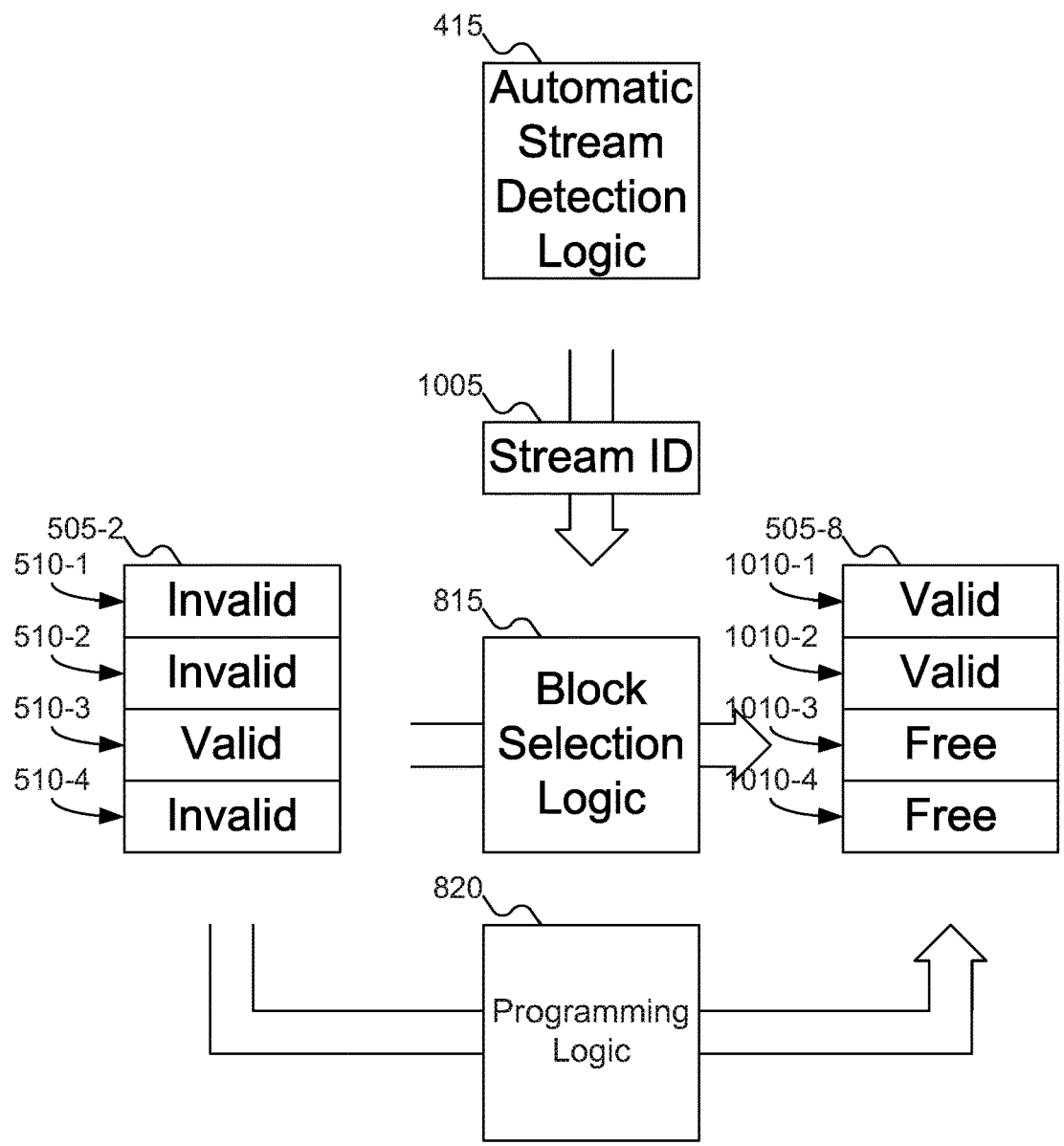
FIG. 10 shows the block selection logic of FIG. 8 selecting a block responsive to the stream ID received from the automatic stream detection logic of FIG. 7, according to an embodiment of the inventive concept.

FIG. 10 shows block selection logic 815 of FIG. 8 selecting a block responsive to the stream ID received from automatic stream detection logic 415 of FIG. 7, according to an embodiment of the inventive concept. In FIG. 10, block selection logic 815 may receive stream ID 1005 from automatic stream detection logic 415. Stream ID 1005 may be determined using attributes of valid data 510-3. Once a block, such as block 505-8, has been selected, a free page in block 505-8, such as free page 1010-3, may be located, and programming logic 820 may write valid data 510-3 to free page 1010-3. Once this operation has completed, then erase logic 810 of FIG. 8 may erase erase block 505-2, thus freeing those pages.

Regardless of how garbage collection logic 715 of FIG. 7 is implemented, embodiments of the inventive concept determine the stream ID used in programming valid data 510-3 approximately at the time valid data 510-3 is to be programmed. That is, garbage collection logic 715 of FIG. 7 is not relying on stream IDs 420-1 through 420-4 of FIG. 4, determined when valid data 510-3 was originally programmed: instead, garbage collection logic 715 of FIG. 7 is determining the stream ID to use in programming valid data 510-3 at approximately the time valid data 510-3 is being programmed to a new (free) page. Nor is garbage collection logic 715 of FIG. 7 relying on such a stream ID that might have been stored with valid data 510-3: an earlier-determined stream ID may no longer reflect the best stream choice for programming valid data 510-3.

Figure 11:
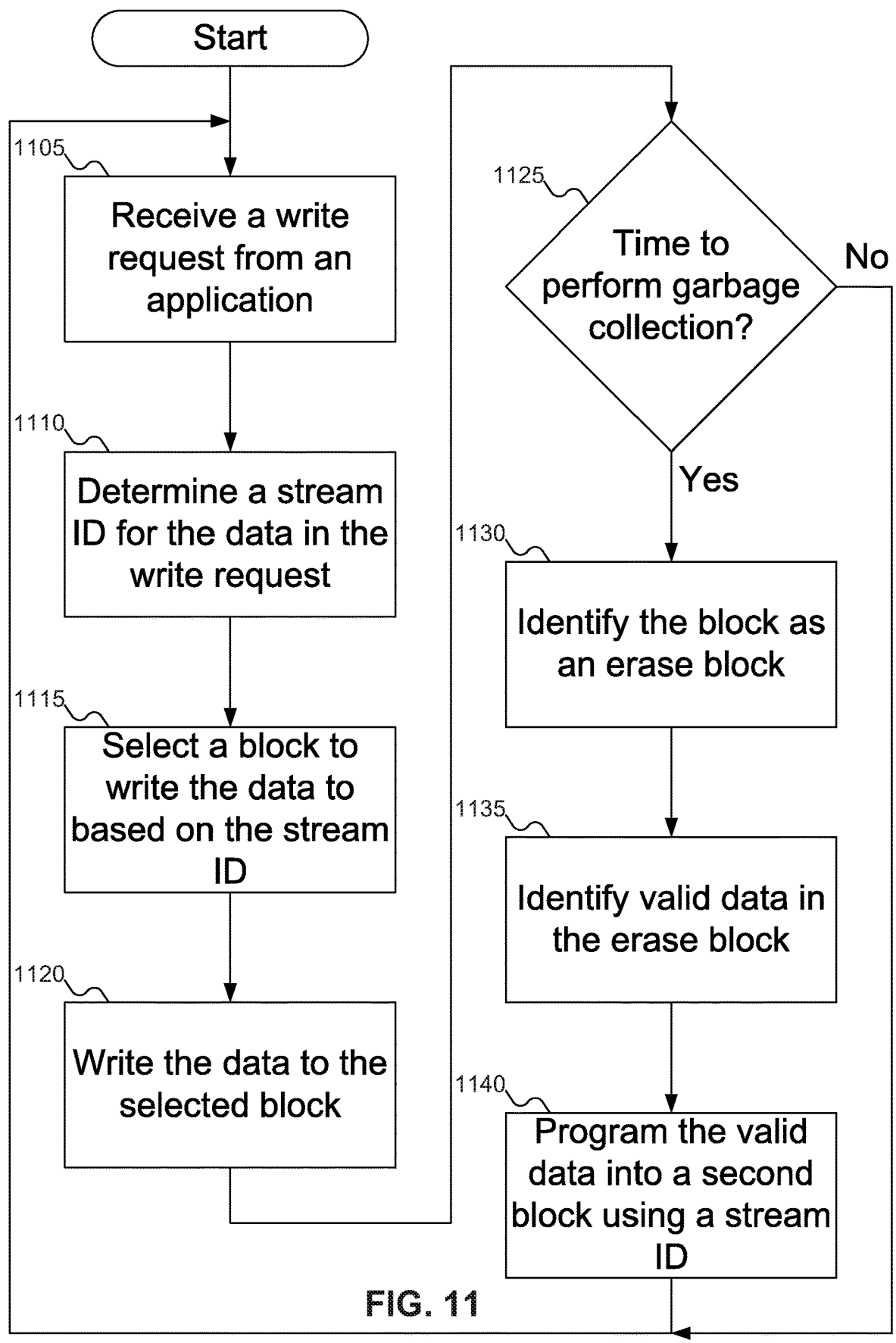
FIG. 11 shows a flowchart of an example procedure for performing garbage collection using a stream ID, according to an embodiment of the inventive concept.

FIG. 11 shows a flowchart of an example procedure for performing garbage collection using stream ID 1005 of FIG. 10, according to an embodiment of the inventive concept. In FIG. 11, at block 1105, receiver 705 of FIG. 7 may receive one or more of write commands 405-1 through 405-4 of FIG. 4. At block 1110, automatic stream detection logic 415 of FIG. 7 may determine stream IDs 420-1 through 420-4 of FIG. 4 for write commands 405-1 through 405-4 of FIG. 4. At block 1115, SSD controller 310 of FIG. 3 may select a block into which data associated with stream IDs 420-1 through 420-4 of FIG. 4 may be written, and at block 1120, SSD controller 310 of FIG. 3 may execute write commands 405-1 through 405-4, writing data to flash memory 315-1 through 315-8 of FIG. 3.

At block 1125, SSD controller 310 of FIG. 3 may check to see if it is time to perform garbage collection. If not, then processing may return to block 1105 to process additional write (or other) commands. But if it is time for SSD controller 310 of FIG. 3 to perform garbage collection, then processing continues with block 1130. SSD controller 310 of FIG. 3 may perform garbage collection either as a foreground operation or a background operation: in the latter case, block 1125 is less about whether SSD controller 310 of FIG. 3 determines that the time has come for garbage collection than whether activity has dropped to a level at which garbage collection may proceed with reduced or minimal impact on read and write requests from applications. At block 1130, garbage collection logic 715 of FIG. 7 may identify an erase block, such as erase block 505-2 of FIG. 5. At block 1135, garbage collection logic 715 of FIG. 3 may identify valid data within erase block 505-2 of FIG. 5. And at block 1140, garbage collection logic 715 of FIG. 7 may program the valid data 510-3 of FIG. 5 into a second block based on stream ID 1005 of FIG. 10, as determined by automatic stream detection logic 415 of FIG. 7. Processing may then return to either block 1105 to process another write (or other) command, or to block 1130 to erase another erase block.

A careful reader may note that the example procedure shown in FIG. 11 does not mention erasing the erase block. This is because the timing of the erase operation may vary, depending on the embodiment of the inventive concept. The erase operation is shown in FIG. 12, described below.

Figure 12:
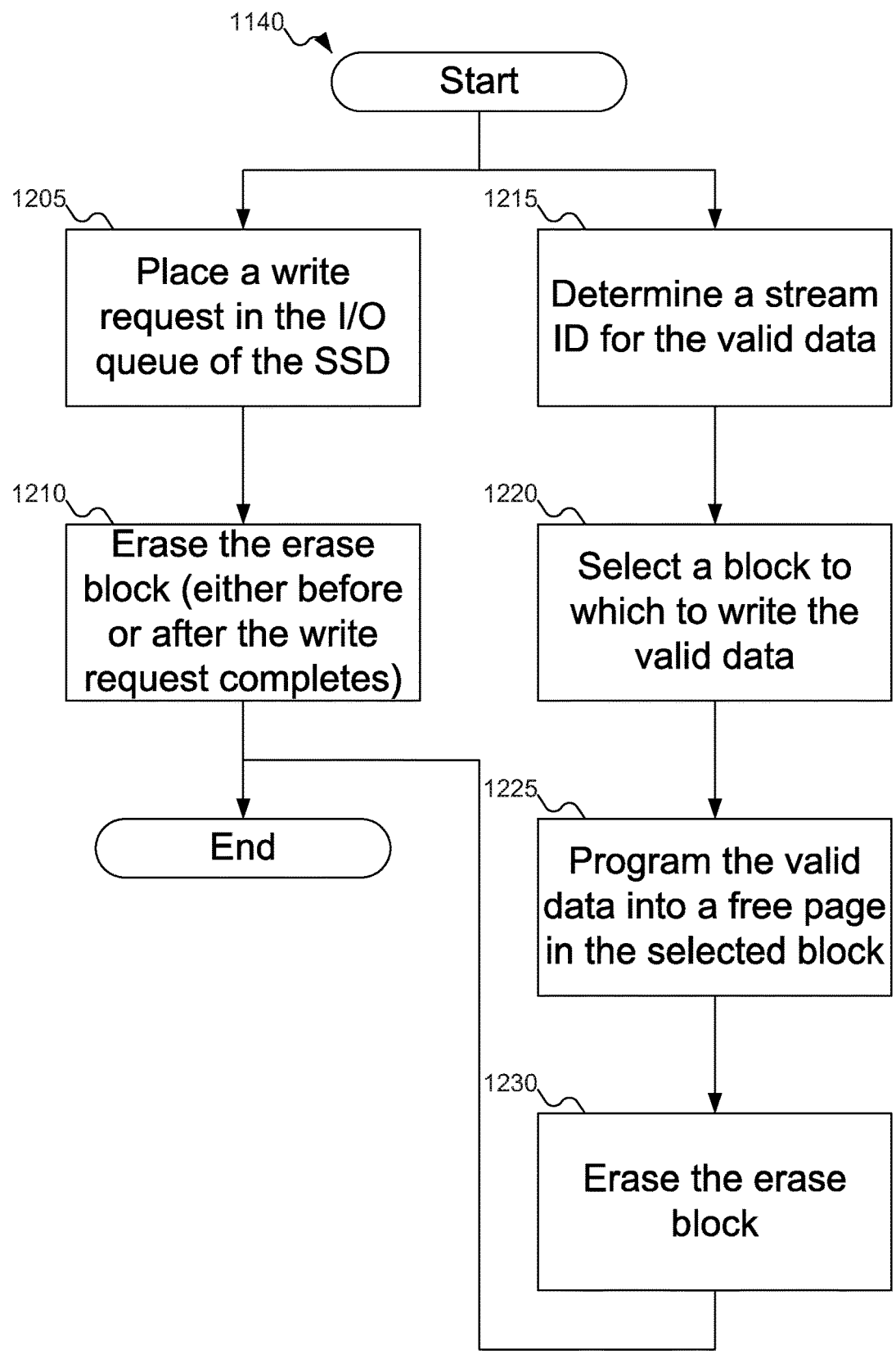
FIG. 12 shows a flowchart of an example procedure for programming valid data from an erase block, according to an embodiment of the inventive concept.

FIG. 12 shows a flowchart of an example procedure for programming valid data 510-3 of FIG. 5 from erase block 510-3 of FIG. 5 during garbage collection, according to an embodiment of the inventive concept. FIG. 12 actually describes two different approaches to performing the programming operation. In one embodiment of the inventive concept, at block 1205, write request logic 805 of FIG. 8 may place a write request in I/O queue 710 of FIG. 7. Effectively, block 1205 is the same as block 1105 of FIG. 11, except for the source of the write request. At that point, the act of writing valid data 510-3 of FIG. 5 into a free page is handled just like a write originating from an application on machine 105 of FIG. 1. At block 1210, erase logic 810 of FIG. 8 may then erase erase block 505-2 of FIG. 5, either waiting for the write request to complete or not.

In another embodiment of the inventive concept, at block 1215, block selection logic 815 of FIG. 8 may request stream ID 1005 of FIG. 10 from automatic stream detection logic 415 of FIG. 7. At block 1220, block selection logic 815 of FIG. 8 may select a block based on stream ID 1005 of FIG. 10. At block 1225, programming logic 820 of FIG. 8 may write valid data 510-3 of FIG. 5 into a free page in the selected block, after which at block 1230 erase logic 810 of FIG. 8 may erase erase block 505-2 of FIG. 5.

In FIGS. 11-12, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

1. An embodiment of the inventive concept includes a Solid State Drive (SSD), comprising:
   flash memory to store data;
   an SSD controller to manage writing data to and reading data from the flash memory;
   an automatic stream detection logic to select a stream identifier (ID) responsive to attributes of the data;
   a garbage collection logic to select an erase block in the flash memory for garbage collection and to program valid data in the erase block into a second block responsive to a first stream ID determined by the automatic stream detection logic,
   wherein the automatic stream detection logic is operative to determine the first stream ID after the garbage collection logic has selected the erase block for garbage collection.

Statement 2. An embodiment of the inventive concept includes a SSD according to statement 1, wherein:
   the SSD controller includes an Input/Output (I/O) queue to manage requests from an application on a host computer; and
   the garbage collection logic includes a write request logic to place a write request for the valid data into the I/O queue.

Statement 3. An embodiment of the inventive concept includes a SSD according to statement 2, the SSD controller further including a receiver to receive a second write request from an application, the second write request including the valid data.

Statement 4. An embodiment of the inventive concept includes a SSD according to statement 3, wherein the SSD writes the valid data to the erase block responsive to a second stream ID from the automatic stream detection logic.

Statement 5. An embodiment of the inventive concept includes a SSD according to statement 4, wherein the first stream ID is the second stream ID.

Statement 6. An embodiment of the inventive concept includes a SSD according to statement 2, wherein the garbage collection logic further includes an erase logic to erase the erase block.

Statement 7. An embodiment of the inventive concept includes a SSD according to statement 6, wherein the erase logic is operative to erase the erase block after the write request is processed by the SSD.

Statement 8. An embodiment of the inventive concept includes a SSD according to statement 6, wherein the erase logic is operative to erase the erase block after the write request logic places the write request in the I/O queue and before the write request is processed by the SSD.

Statement 9. An embodiment of the inventive concept includes a SSD according to statement 1, wherein:
   the garbage collection logic is operative to request the first stream ID from the automatic stream detection logic before programming the valid data; and
   the garbage collection logic includes:
   a block selection logic to select a second block responsive to the first stream ID; and
   a programming logic to write the valid data to the second block.

Statement 10. An embodiment of the inventive concept includes a SSD according to statement 9, wherein the second block is a special block that only stores data programmed during the garbage collection.

Statement 11. An embodiment of the inventive concept includes a SSD according to statement 1, wherein the stream ID is responsive to at least one of a Logical Block Address (LBA) of the valid data, an application ID of an application responsible for originally writing the valid data to the SSD, a remaining lifetime for the valid data, a sequentiality for the valid data, an update frequency for the valid data, a recency for the valid data, a write size for the valid data, a write time for the valid data, a read frequency for the valid data, and a read temperature for the valid data.

Statement 12. An embodiment of the inventive concept includes a method, comprising:
   identifying an erase block on a Solid State Drive (SSD) for garbage collection;
   identifying valid data in the erase block that requires programming; and
   programming the valid data in the erase block into a second block, the second block selected responsive to a stream identifier (ID), where the stream ID is determined after identifying the valid data in the erase block that requires programming has been identified and responsive to attributes of the valid data.

Statement 13. An embodiment of the inventive concept includes a method according to statement 12, further comprising, before identifying valid data in the erase block that requires programming:
   receiving, at the SSD, the valid data in a write request from an application;
   determining a second stream ID responsive to the attributes of the valid data;
   selecting the erase block responsive to the second stream ID; and
   writing the valid data to the erase block.

Statement 14. An embodiment of the inventive concept includes a method according to statement 13, wherein the stream ID is the second stream ID.

Statement 15. An embodiment of the inventive concept includes a method according to statement 12, wherein programming the valid data in the erase block into a second block includes placing a write request into an Input/Output (I/O) queue to write the valid data to the second block.

Statement 16. An embodiment of the inventive concept includes a method according to statement 15, further comprising erasing the erase block.

Statement 17. An embodiment of the inventive concept includes a method according to statement 16, wherein erasing the erase block includes erasing the erase block before the valid data is written to the second block.

Statement 18. An embodiment of the inventive concept includes a method according to statement 12, wherein programming the valid data in the erase block into a second block includes:

determining the stream ID for the valid data responsive to the attributes of the valid data;

selecting the second block responsive to the stream ID; and programming the valid data to the second block.

Statement 19. An embodiment of the inventive concept includes a method according to statement 18, wherein selecting the second block responsive to the stream ID includes selecting a special block responsive to the stream ID, the special block only storing data programmed during the garbage collection.

Statement 20. An embodiment of the inventive concept includes a method according to statement 12, wherein the stream ID is responsive to at least one of a Logical Block Address (LBA) of the valid data, an application ID of an application responsible for originally writing the valid data to the SSD, a remaining lifetime for the valid data, a sequentiality for the valid data, an update frequency for the valid data, a recency for the valid data, a write size for the valid data, a write time for the valid data, a read frequency for the valid data, and a read temperature for the valid data.

Statement 21. An embodiment of the inventive concept includes an article comprising a non-transitory storage medium, the non-transitory storage medium having stored thereon instructions that, when executed by a machine, result in:

identifying an erase block on a Solid State Drive (SSD) for garbage collection;

identifying valid data in the erase block that requires programming; and programming the valid data in the erase block into a second block, the second block selected responsive to a stream identifier (ID), where the stream ID is determined after identifying the valid data in the erase block that requires programming has been identified and responsive to attributes of the valid data.

Statement 22. An embodiment of the inventive concept includes an article according to statement 21, the non-transitory storage medium having stored thereon further instructions that, when executed by the machine, result in, before identifying valid data in the erase block that requires programming:

receiving, at the SSD, the valid data in a write request from an application;

determining a second stream ID responsive to the attributes of the valid data;

selecting the erase block responsive to the second stream ID; and writing the valid data to the erase block.

Statement 23. An embodiment of the inventive concept includes an article according to statement 22, wherein the stream ID is the second stream ID.

Statement 24. An embodiment of the inventive concept includes an article according to statement 21, wherein programming the valid data in the erase block into a second block includes placing a write request into an Input/Output (I/O) queue to write the valid data to the second block.

Statement 25. An embodiment of the inventive concept includes an article according to statement 24, the non-transitory storage medium having stored thereon further instructions that, when executed by the machine, result in erasing the erase block.

Statement 26. An embodiment of the inventive concept includes an article according to statement 25, wherein erasing the erase block includes erasing the erase block before the valid data is written to the second block.

Statement 27. An embodiment of the inventive concept includes an article according to statement 21, wherein programming the valid data in the erase block into a second block includes:

determining the stream ID for the valid data responsive to the attributes of the valid data;

selecting the second block responsive to the stream ID; and programming the valid data to the second block.

Statement 28. An embodiment of the inventive concept includes an article according to statement 27, wherein selecting the second block responsive to the stream ID includes selecting a special block responsive to the stream ID, the special block only storing data programmed during the garbage collection.

Statement 29. An embodiment of the inventive concept includes an article according to statement 21, wherein the stream ID is responsive to at least one of a Logical Block Address (LBA) of the valid data, an application ID of an application responsible for originally writing the valid data to the SSD, a remaining lifetime for the valid data, a sequentiality for the valid data, an update frequency for the valid data, a recency for the valid data, a write size for the valid data, a write time for the valid data, a read frequency for the valid data, and a read temperature for the valid data.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A device, comprising:
   memory to store data, the memory storing a first data in a first portion based on a first request from another device and a second data in a second portion based on a second request from the other device, the first portion based on a first stream identifier (ID) based on the first request and the second portion based on a second stream ID based on the second request;
   a controller to manage writing data to or reading data from the memory;
   a stream logic to select a third stream ID based on at least one attribute of the first data, wherein the third stream ID comprises any of the first stream ID, the second stream ID, or a different stream ID, and wherein the stream logic is capable of selecting any of the first stream ID, the second stream ID, and the different stream ID for the first data.

2. The device according to claim 1, wherein:
   the controller includes an Input/Output (I/O) queue to receive requests from an application on the other device, the requests from the application on the other device including at least one read request and at least one write request; and
   the device further includes a write request logic to place a programming request for the first data from a garbage collection logic into the I/O queue.

3. The device according to claim 2, wherein the controller further includes a receiver to receive an earlier request from the application, the earlier request including the first data, the earlier request resulting in the first data being written to the first portion before the garbage collection unit selects the first portion for garbage collection.

4. The device according to claim 3, wherein the device writes the first data to the first portion based on the earlier request and the first stream ID from the stream logic, wherein the first stream ID is one of at least two stream IDs that the stream logic may select based on the first data.

5. The device according to claim 2, wherein the garbage collection logic further includes an erase logic to erase the first portion.

6. The device according to claim 5, wherein the erase logic is operative to erase the first portion after the programming request is processed by the device.

7. The device according to claim 5, wherein the erase logic is operative to erase the first portion after the write request logic places the programming request in the I/O queue and before the programming request is processed by the device.

8. The device according to claim 1, further comprising:
a garbage collection logic to request the third stream ID from the stream logic before programming the first data, the garbage collection logic including:
a portion selection logic to select the third portion based on the third stream ID; and
a programming logic to write the first data to the third portion,
wherein the third portion is one of at least two third portions that may be selected by the portion selection logic.

9. The device according to claim 8, wherein the third portion is a special portion that only stores data programmed during the garbage collection.

10. The device according to claim 1, wherein the third stream ID is based on at least one of an application ID of an application responsible for originally writing the first data to the device, a remaining lifetime for the first data, a sequentiality for the first data, a recency for the first data, a write size for the first data, a write time for the first data, and a read frequency for the first data.

11. A method, comprising:
identifying a first portion on a device for garbage collection, the first portion storing a first data, the device also including a second portion storing a second data, the first portion based on a first stream identifier (ID) and the second portion based on a second stream ID, the first data stored in the first portion based on a first request from another device and the second data stored in the second portion based on a second request from the other device;
identifying the first data in the first portion that requires programming;
selecting, by a stream logic, a third stream ID for the first data based on at least one attribute of the first data, wherein the stream logic is capable of selecting any of the first stream ID, the second stream ID, and a different stream ID as the third stream ID and wherein the third stream ID is selected after identifying the first data in the first portion that requires programming has been identified; and
programming the first data in the first portion into a third portion, the third portion selected based on the third stream ID.

12. A method according to claim 11, wherein programming the first data in the first portion into a third portion includes placing a programming request into an Input/Output (I/O) queue to write the first data to the third portion, the I/O queue operative to receive requests from an application on the other device, the requests from the application on the other device including at least one read request and at least one write request.

13. A method according to claim 12, further comprising erasing the first portion.

14. A method according to claim 13, wherein erasing the first portion includes erasing the first portion before the first data is written to the third portion.

15. A method according to claim 11, wherein programming the first data in the first portion into a third portion includes:
selecting the third portion based on the third stream ID; and
programming the first data to the third portion,
wherein the third portion is one of at least two third portions that may be selected based on the third stream ID.

16. A method according to claim 15, wherein selecting the third portion based on the third stream ID includes selecting a special portion based on the third stream ID, the special portion only storing data programmed during the garbage collection.

17. A method according to claim 11, wherein the third stream ID is based on at least one of, an application ID of an application responsible for originally writing the first data to the device, a remaining lifetime for the first data, a sequentiality for the first data, a recency for the first data, a write size for the first data, a write time for the first data, and a read frequency for the first data.

18. A method according to claim 11, wherein a value for the at least one attribute of the first data may vary depending on the first request.

19. A method, comprising:
receiving, from another device at a device, a first request including a first data;
selecting a first stream ID based on the first request;
writing the first data to a first portion on the device based on the first request, the first portion based on the first stream ID;
receiving, from the other device at the device, a second request including a second data;
selecting a second stream ID based on the second request, the second stream ID different from the first stream ID;
writing the second data to a second portion on the device based on the second request, the second portion based on the second stream ID; and
identifying the first portion for garbage collection;
identifying the first data in the first portion as requiring programming;
selecting, by a stream logic, a third stream ID based on at least one attribute of the first data, where the third stream ID may be any of the first stream ID, the second stream ID, or a different stream ID, and wherein the stream logic is capable of selecting any of the first stream ID, the second stream ID, and the different stream ID for the first data; and
programming the first data into a third portion on the device based on the third stream ID.

20. A method according to claim 19, wherein the third portion is the second portion.

* * * * *